United States Patent [19]

Bauer

[11] 4,304,749

[45] Dec. 8, 1981

[54] METHOD FOR MASS PRODUCTION ASSEMBLY OF FLUIDIC DEVICES

[76] Inventor: Peter Bauer, 13921 Esworthy Rd., Germantown, Md. 20767

[21] Appl. No.: 123,758

[22] Filed: Feb. 22, 1980

[51] Int. Cl.³ .................. B29C 6/04; B29C 27/00; B29D 9/00
[52] U.S. Cl. .................. 264/263; 264/230; 264/250; 264/273; 264/DIG. 71; 264/DIG. 76
[58] Field of Search ............... 264/230, 263, 261, 262, 264/273, DIG. 76, 250, DIG. 71, 274

[56] References Cited

U.S. PATENT DOCUMENTS

| | | | |
|---|---|---|---|
| 2,687,260 | 8/1954 | Morris | 264/263 |
| 3,221,089 | 11/1965 | Cotton | 264/261 |
| 3,287,485 | 11/1966 | McCord | 264/263 |
| 3,293,106 | 12/1966 | Cocco et al. | 264/263 |
| 3,339,609 | 9/1967 | Cushman | 264/261 |
| 3,362,302 | 1/1968 | Friedman | 264/263 |
| 3,458,619 | 7/1969 | Prochaska | 264/261 |
| 3,698,961 | 10/1972 | Niemann | 264/261 |

FOREIGN PATENT DOCUMENTS 221764 7/1959 Australia ..................... 264/262

Primary Examiner—James B. Lowe
Attorney, Agent, or Firm—Griffin, Branigan & Butler

[57] ABSTRACT

A method is disclosed for assembling fluidic spray devices wherein a fluidic element formed on the surface of a body member is expeditiously sealed to form the device. The essence of the invention is the injection molding of plastic around or through the body and a cover plate, or into a prefabricated housing into which the body member is inserted, to preload the parts and force them into a permanent sealed assembly. In one embodiment the preloading is achieved by shrinkage tension of injected plastic material surrounding or penetrating the parts. In a second embodiment the preloading is achieved by injecting plastic material into a gap or gaps in a product housing containing the body member so as to force the element surface against a sealing surface.

13 Claims, 10 Drawing Figures

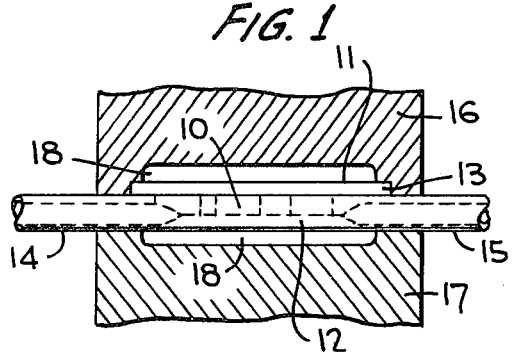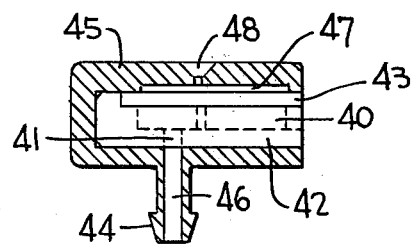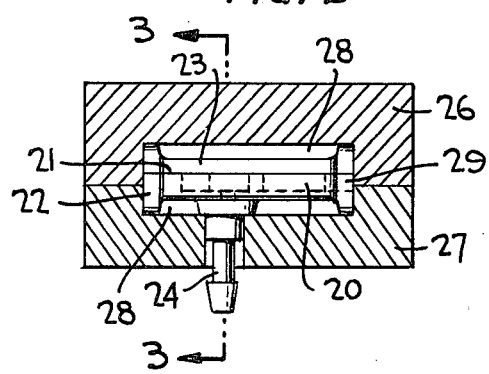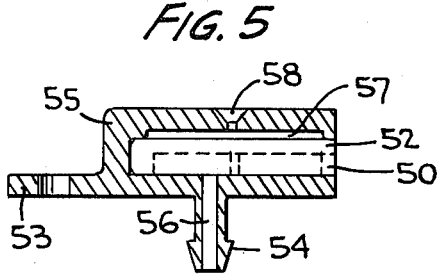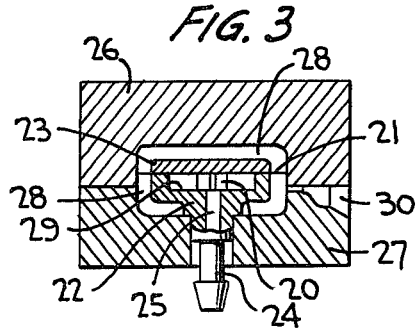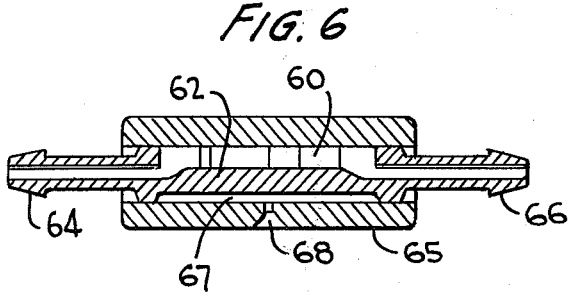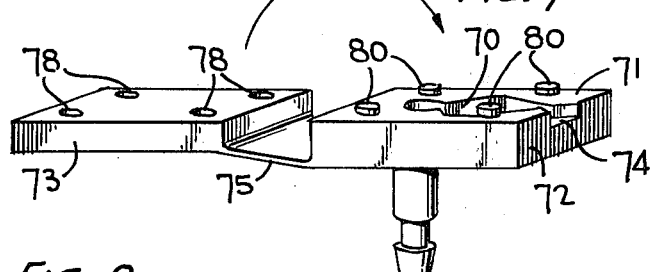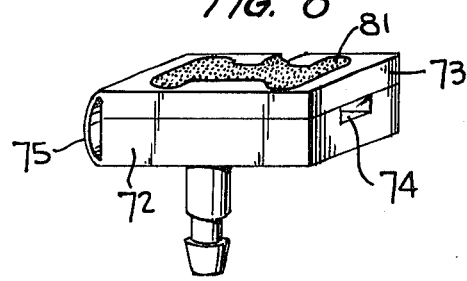

METHOD FOR MASS PRODUCTION ASSEMBLY OF FLUIDIC DEVICES

TECHNICAL FIELD

The present invention relates to assembling fluidic devices and, more particularly, to an improved assembly technique whereby fluidic devices can be mass produced inexpensively and reliably.

BACKGROUND ART

It is by now well known that fluidic elements are particularly well suited for serving as spray nozzles. For examples, see U.S. Pat. Nos. 3,423,026; 3,432,102; 3,458,888; 3,563,462; 3,638,866; 3,741,481; 3,973,558; 4,052,002; 4,151,955; 4,157,161 and 4,184,636. These patents disclose fluidic spray nozzles which are fabricated by a variety of techniques. In most cases the fluidic element is defined in the surface of a body member and then sealed by a cover plate. Sealing is usually effected by adhesive, screws, ultrasonic bonding, or similar techniques. These techniques are generally time consuming and rather unsuitable for mass production. There have been a few prior art attempts to avoid these disadvantages. For example, in one technique the fluidic element is formed on one surface of a plate which is forced into a housing through a slot sized to hold the plate under compression while retaining the plate in the housing. In practice this technique has experienced fracture of the housing, leakage of spray fluid, and other disadvantages.

Another attempt to solve the problem is found in the aforementioned U.S. Pat. No. 4,151,955 which discloses a particular type of fluidic oscillator which can be molded in one piece, thereby eliminating the need for a sealing plate and avoiding the requirement for an assembly step in the fabrication process. This technique has utility only for the particular fluidic oscillator disclosed and is also sensitive to dimensions in the mold which change with use and age.

It is an object of the present invention to overcome the disadvantages of prior art techniques and provide an efficient method for mass producing fluidic spray devices.

DISCLOSURE OF THE INVENTION

In accordance with the present invention, a fluidic element formed in the surface of a body member is sealed against a sealing surface by pre-loading the body member against the sealing surface with injection molded plastic material. The injection molding may take place in a separate mold wherein the injected plastic material is permitted to surround a portion of the body member and cover plate within the mold cavity. Alternatively, the "mold" may be the final housing for the spray device whereby the plastic material is injected into a gap in the housing to force the body member against a cover plate or a housing surface to effect sealing. In another alternative, the plastic material may be injected through suitably provided holes of rivet-like cross-section in the body member and cover plate whereupon the plastic shrinks on cooling and binds the cover plate and body member together in sealing relation.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a view in section of one embodiment of the present invention;

FIG. 2 is a view in section of a second embodiment of the present invention;

FIG. 3 is a view in section taken along lines 3—3 of FIG. 2;

FIG. 4 is a view in section of another embodiment of the present invention;

FIG. 5 is a view in section of still another embodiment of the present invention;

FIG. 6 is a view in section of a further embodiment of the present invention;

FIG. 7 is a view in perspective of yet another embodiment of the present invention prior to final assembly;

FIG. 8 is a view in perspective of the embodiment of FIG. 7 after final assembly;

BEST MODE OF CARRYING OUT THE INVENTION

Figure 9:
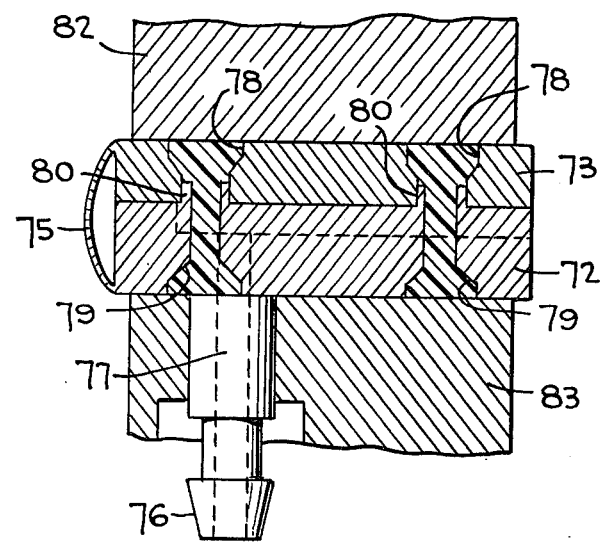
FIG. 9 is a side view in section of the embodiment of FIGS. 7 and 8 during assembly.

Referring to FIG. 1, a fluidic oscillator 10 is shown as recessed passages defined in the top surface 11 of a body member 12. The recessed passages are sealed by means of a cover plate 13 disposed flush against surface 11. A pair of passages 14 and 15 conduct working fluid to and from the oscillator 10. Fluidic oscillator 10 may be any fluidic oscillator, such devices and their fabrication being well known. By way of example, the oscillator may take any of the forms illustrated and described in my U.S. Pat. Nos. 3,741,481; 4,157,161 and 4,184,636.

Body member 12 and cover plate 13 are shown disposed between two schematically represented conventional mold halves 16 and 17 such that a continuous gap or space 18 surrounds portions of the abutting member and cover plate. Upon injecting plastic into space 18 and then letting the injected plastic solidify, a band of plastic is formed to match the contour of space 18. The band of plastic shrinks about the body member 12 and cover plate 13, thereby forcing the cover plate and body member together to seal the oscillator 10. The finally assembled unit therefore is made up of the cover plate 13, the body member 12 and the plastic material injected into space 18.

It should be noted that the body member 12 and cover plate 13 may be made of plastic in which case it may be desirable for the injected plastic to have a lower melting temperature than that used for the body member and cover plate; this, however, is not an imperative feature and all three parts can be made of the same plastic material if desired. It should also be noted that the body member 12 and cover plate 13 need not be plastic but could instead be metal or other suitable material which retains its shape.

A similar arrangement is illustrated in FIGS. 2 and 3 wherein the final product, instead of having an outlet tube, is provided with an outlet opening so that fluid may be sprayed into the surrounding environment from the device. Specifically, a body member 22 has a fluidic oscillator 20 defined in its upper surface 21. Oscillator 20 may be of the same type described for oscillator 10. A cover plate 23 is disposed over surface 21 and the two pieces are placed between mold halves 26 and 27. Body member 22 includes a depending stem portion 24 through which a fluid supply bore 25 is longitudinally defined. The oscillator 20 is defined in surface 21 at a location where the oscillator outlet region 29 opens to the edge of the body member 22 whereby fluid from the oscillator can be sprayed into the surrounding ambient environment (after the device has been removed from the mold halves).

The body member 22 and cover plate 23 are provided with a cut away portion in the form of a band 28 extending entirely about the body member and cover plate. This band 28 defines a gap between the mold halves 26, 27, surrounding the device but within the extreme outer confines of the body member and cover plate. This gap communicates with an injection molding inlet 30 defined in the mold halves (for example, mold half 27). Upon injection of molten plastic through nozzle 30, the plastic fills gap 28 and solidifies upon cooling. The solidified plastic shrinks about the body member 22 and cover plate 23, binding these two elements together in sufficiently tight engagement to seal the fluidic oscillator defined in surface 21.

Whereas the device of FIG. 1 is useful for connection in a fluid system to which tubes 14 and 15 are suitable for connection, the device of FIGS. 2 and 3 is suitable for use as a spray nozzle.

The technique illustrated in FIGS. 1-3 for assembling a body member and cover plate in pressure-sealing relationship can be employed without the need for mold or die cavity members. One example of this is illustrated in FIG. 4. An oscillator 40 is defined in a body member 42 and covered by cover plate 43. A housing 45 is provided with an internal cavity, open to ambient at one end, into which the abutting body member 42 and cover plate 43 are inserted. Housing 45 includes a depending stem 44 in which a longitudinal inflow bore 46 is defined. Bore 46 aligns with a passage 41 defined through body member 42 when the body member is fully inserted into the housing cavity. Passage 41 supplies fluid under pressure to oscillator 40 when such fluid is applied to inlet bore 46.

The body member 42 and cover plate 43 fill all but a relatively small flat space or gap 47 of the housing cavity. This gap is located adjacent the cover plate 43 and must be so located that it can be filled with injected plastic which, upon solidifying, compresses the body member and cover plate together to permanently seal the oscillator within housing 45. In so doing, the upper end of inlet bore 46 is urged against body member 42 to prevent leakage of inflowing spray fluid. A suitable injection passage 48 is defined in housing 45 to permit the molten plastic to be injected into the gap. The resulting spray device includes the body member 42, cover plate 43, housing 45 and the injected plastic in what had been gap 47. Fluid to be sprayed is received via stem 44 and sprayed from the right end (as viewed in FIG. 4) of the oscillator in a spray pattern which depends upon the particular oscillator configuration.

It is possible to provide a device according to the present invention which is similar to that of FIG. 4 but wherein the cover plate 43 can be eliminated. Such a device is illustrated in FIG. 5 wherein a body member 52 is inserted into a cavity defined in a housing 55. A fluidic oscillator 50 is defined in one surface of the body member and is disposed flush against one interior wall of the housing. The opposite interior wall of the housing is slightly spaced from body member 52 to define a gap 57. Injection inlet passage 58 is defined through housing 50 to permit molten plastic to be injected into gap 57. A housing stem 54 depends from the housing and has a fluid supply bore 56 defined longitudinally therethrough to communicate with oscillator 50. The housing may be provided with an apertured tab-like extension 53 to facilitate mounting to another body, if desired.

Referring to FIG. 6, a body member 62, having a fluidic oscillator 60 defined in a surface thereof, is inserted into a suitably provided through-slot or cavity in a housing 65. The body member includes inlet and outlet tubes 64, 66 provided as an integral part thereof and extending out from opposite ends of the housing slot. The side of the body member opposite oscillator 60 is provided with a recessed area which defines a gap 67 between the body member and housing wall. An injection inlet passage 68 communicates with gap 67. This arrangement is similar in assembly concept to the drevice of FIG. 5, the difference residing in the fact that the FIG. 5 device is a spray nozzle whereas the FIG. 6 device is a fluidic element adapted to be connected via tubes 14, 66 to a fluid system.

Figure 10:
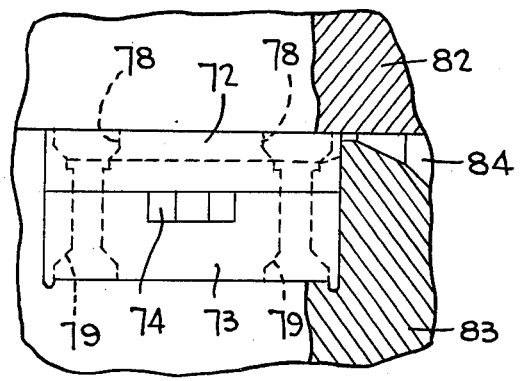
FIG. 10 is a front view of the device of FIG. 9.

Rather than surrounding the body member and cover plate with injected plastic in a mold, or injecting plastic into a gap in a permanent housing to urge the oscillator surface into compressed abutment with a sealing surface, the concept of the present invention may be employed to flow injected plastic through suitably provided holes in the body member and cover plate to provide a rivet-like joining of the two members. Such an embodiment is illustrated in FIGS. 7-10. A fluidic oscillator 70 is defined in a surface 71 of a body member 72. The oscillator 70 has an outlet opening 74 adapted to issue a sweeping third spray into the surrounding ambient environment. A cover plate 73 is integrally joined to body member 72 by means of a thin bridging member 75. An inlet stem 76 depends from body member 72 and includes a fluid supply bore 77 defined longitudinally therethrough and through the body member to communicate with oscillator 70. The entire unit as thus far described may be fabricated as one piece in a molding process. For final assembly the bridging member 75 is folded so that cover plate 73 is placed flush on surface 71 of body member 72. Suitable holes 78 are defined through cover plate 73 at spaced locations along the cover plate. Holes 78 are wider at the side of the cover plate remote from body member 72, forming a generally funnel shaped hole configuration. Similar holes 79 are provided through body member 73 at locations which permit holes 78 and 79 to be aligned when the cover plate is folded over onto the body member. In order to facilitate alignment of the holes, collars 80 are provided to project from surface 71 concentrically about each hole 79 and are of such size and configuration as to be received without significant slack within holes 78 when the cover plate is properly aligned on surface 71. Collars 80 also serve during injection to prevent the flowing plastic from flowing along the mating surfaces between members 72 and 73. The holes 78 are wider at the side of body member 72 remote from cover plate 73.

Cover plate 73 on the surface remote from body member 72, has recesses on channels 81 defined therein which interconnect the holes 78 as they communicate with that surface. These channels 81 permit injected molten plastic to flow into holes 78 to holes 79. To this end, the abutting cover plate 73 and body member 72 are clamped between two mold halves 82, 83 (FIGS. 9 and 10) which include an injection inlet opening 84. When plastic is injected into opening 84 it flows through and fills channels 81 and holes 78 and 79. Upon solidifying the plastic in the holes applies a shrinkage stress compression force which holds the body member and cover plate together. In this regard it is noted that the wide-to-narrow configuration of holes 78, 79 permits the solidified plastic therein to act like a rivet in joining the two elements together. Aiding this function is the expansion of collar 80 against the walls of hole 78 by the solidifying plastic. The final assembly (as seen in FIG. 8) is a compact one piece unit sealed by a simple plastic injection step.

As briefly mentioned above, the parts to be assembled are preferably made of a thermo-set plastic such as a phenolic. The injected plastic material could then be any other injection moldable plastic. Alternatively, polypropylene or certain acetal plastics can be used for the assembled members and the same material or ABS (having a slightly lower melting temperature) can be injected as the sealer. In this regard it should be noted that the injected material comprises far less mass than the assembled parts so that "cold-shot" injection may be used wherein the injected material cools before the base materials melt.

While I have described and illustrated one specific embodiment of my invention, it will be clear that variations of the details of construction which are specifically illustrated and described may be resorted to without departing from the true spirit and scope of the invention as defined in the appended claims.

I claim:
1. The method of assembling a fluidic device comprising the steps of:
   (a) forming a fluidic element in a first surface of a body member;
   (b) placing said first surface in abutting relationship with a sealing surface of a second member; and
   (c) injection molding molten plastic material into direct contact with at least one of said body member and second member to preloadingly compress said first and sealing surfaces against one another such that the injected plastic, upon cooling and solidifying, forms part of said device and compressively forces said first and sealing surfaces against one another to seal said fluidic element.

2. The method according to claim 1 wherein said second member is a cover plate, wherein step (b) includes positioning said body member and said cover plate in a mold such that an empty space is provided in said mold at least partially surrounding said cover plate and body member, and wherein step (c) includes filling said empty space with injection molded plastic.

3. The method according to claim 2 wherein said body member and cover plate are provided with cut-away portions defining said empty space whereby the injection molded plastic fills the cut-away portions.

4. The method according to claim 2 wherein said empty space is defined by recessed portions in said mold.

5. The method according to claim 1, wherein step (b) includes positioning said body member in a cavity of a housing for said device, and wherein step (c) includes injecting plastic material into a gap in said cavity such that the plastic material in said gap compresses the body member against said sealing surface.

6. The method according to claim 5 wherein said second member is said housing, wherein sealing surface is a surface of said cavity and wherein said gap is defined between said body member and another surface of said cavity opposite said sealing surface.

7. The method according to claim 5 wherein said second member is a separate cover plate positioned in step (b) on said first surface in said cavity, and wherein said gap is defined between a surface in said cavity and one of said body member and cover plate.

8. The method according to claim 7 wherein said gap is defined between said surface of said cavity and said cover plate.

9. The method according to claim 1 wherein step (c) includes injecting plastic material through aligned holes in said body member and second members to effectively rivet the body member and second member together upon solidification of the plastic material.

10. The method according to claim 9 wherein said second member includes a cover plate.

11. The method according to claims 9 or 10 wherein step (b) includes aligning the holes in said body member and second member by inserting collar projections surrounding the holes in one of said members into the holes of the other said members.

12. The method according to claim 9 or 10 wherein the holes in one of said members are interconnected by channels on a surface remote from said fluidic element, and wherein step (c) includes flowing the plastic material through said channels to fill the holes in both members.

13. The method according to claim 10 wherein said cover plate is formed integrally with said body member, the cover plate and body member being joined by an integral bridging member, and wherein step (b) includes folding the device along the bridging member to place the cover plate directly on said first surface.

* * * * *